United States Patent [19]

Hedstrom

[11] Patent Number: 5,058,660
[45] Date of Patent: * Oct. 22, 1991

[54] SHARED COOLANT SYSTEM FOR MARINE GENERATOR

[75] Inventor: Randall J. Hedstrom, Sheboygan, Wis.

[73] Assignee: Kohler Co., Kohler, Wis.

[ * ] Notice: The portion of the term of this patent subsequent to Jan. 29, 2008 has been disclaimed.

[21] Appl. No.: 591,188

[22] Filed: Oct. 1, 1990

Related U.S. Application Data

[62] Division of Ser. No. 491,044, Mar. 9, 1990, Pat. No. 4,987,953.

[51] Int. Cl.$^5$ .......................... H02P 9/04; H02K 5/20; H02K 9/00
[52] U.S. Cl. .................................... 165/47; 123/41.31; 310/54; 310/68 D; 290/1 A; 165/80.3; 165/80.4
[58] Field of Search ..................... 123/41.31; 165/80.4, 165/47

[56] References Cited

U.S. PATENT DOCUMENTS

| | | | |
|---|---|---|---|
| 3,141,998 | 7/1964 | Silkman | 165/80.4 |
| 3,437,132 | 4/1969 | Venema | 165/80.4 |
| 3,780,712 | 12/1973 | Pace | 123/41.31 |
| 4,079,410 | 3/1978 | Schierz | 357/82 |
| 4,209,799 | 6/1980 | Schierz et al. | 357/81 |
| 4,557,225 | 12/1985 | Sagues et al. | 123/41.31 |
| 4,720,981 | 1/1988 | Helt et al. | 165/80.4 |
| 4,728,306 | 3/1988 | Schneider | 440/541 |
| 4,739,204 | 4/1988 | Kitamura et al. | 123/41.31 |
| 4,765,283 | 8/1988 | Kitamura et al. | 123/41.31 |
| 4,768,352 | 9/1988 | Maruyama | 165/80.4 |
| 4,768,492 | 9/1988 | Widmer et al. | 123/41.31 |
| 4,864,974 | 12/1989 | Ago | 123/41.31 |
| 4,922,148 | 5/1990 | Kitamura | 123/41.31 |

Primary Examiner—John K. Ford
Attorney, Agent, or Firm—Quarles & Brady

[57] ABSTRACT

A voltage regulator for an electrical generator driven by an internal combustion engine is cooled by water flowing through a heat exchanger attached to the voltage regulator. The cooling water is obtained from the upstream side of a secondary cooling loop of a water-to-water cooling system associated with the internal combustion engine, such secondary water typically at an ambient temperature less than or equal to that of the air. In one embodiment, the heat exchanger is formed from a heat conductive tube attached to the heat sink of at least one semiconductor device regulating the current through the field coils of the generator.

4 Claims, 2 Drawing Sheets

SHARED COOLANT SYSTEM FOR MARINE GENERATOR

This is a division of application Ser. No. 07/491,044, filed Mar. 9, 1990 now U.S. Pat. No. 4,987,953.

BACKGROUND OF THE INVENTION

1. Field of the Invention

The field of the invention is electrical generators powered by internal combustion engines, and in particular, voltage regulators associated with such electrical generators.

2. Background Art

An electrical generator may be connected with an internal combustion engine to provide a means of generating emergency electrical power or generating electrical power at locations removed from electrical utilities.

When an A.C. generator is used, the speed of the engine is mechanically regulated to control the frequency of the A.C. electrical power, typically to 50–60 Hz. The output voltage of the generator is regulated by controlling the current in the field coil of the generator. Decreasing the field current, for a given load and speed of generator rotation, decreases the output voltage at the armature. Conversely, increasing the field current, for a given speed of generator rotation, increases the voltage at the armature.

The control of the field current for the purpose of controlling the generator output voltage is performed by a voltage regulator. Simple voltage regulators may be constructed from contacts that switch a resistance in series with the field windings to reduce the field current when the output voltage rises above a predetermined limit. Improved voltage regulators may be constructed from solid-state devices such as transistors or SCR's to provide continuous control of the field current in response to variations in the generator output voltage.

Considerable internal heat may be generated in the solid state device during regulation of the field current, depending on the capacity of the generator and its operating load. Higher wattage generators require voltage regulators having solid state devices with correspondingly higher power ratings to accept this higher heat load.

Voltage regulators used in electrical generators driven by internal combustion engines also experience an increased ambient temperature as a result of the externally generated heat from the internal combustion engine. Higher ambient temperatures require that the power dissipation ratings of the solid state devices be "lowered" to reflect the device's decreased ability to dissipate heat into the environment. Care may be taken to mount the voltage regulator in a manner to reduce the heat absorbed by the regulator from the engine. "Heat sinks" comprised of heat radiating air fins may be attached to the regulator to improve its ability to dissipate internally generated heat. Nevertheless, there may be little air flow to cool such heat sinks, particularly in marine-type engines where there is no radiator and hence no radiator fan to move air past the heat sink fins. Accordingly, an additional margin is ordinarily added to the specified power ratings of a solid state device used in voltage regulators operating in environments with elevated temperatures.

Solid state devices with high power ratings are more expensive. Further, within the design limits of a given solid state device, operation at elevated temperatures, either because of internally generated heat or externally generated heat, may decrease the operating life and reliability of the device.

SUMMARY OF THE INVENTION

The present invention makes use of the cooling water used in the secondary loop of a water-to-water engine cooling system to separately cool the semiconductor device of the voltage regulator. The temperature of the water in the primary cooling loop of an internal combustion engine may be as high as 120° C. and thus too hot to provide useful cooling to the semiconductor device. In a water-to-water cooling system, however, such as that found on many marine engines, the secondary cooling loop continuously draws raw water with a temperature of approximately 32° C. Frequently this raw water is cooler than the ambient air temperature in the vicinity of the regulator. The raw water in the secondary cooling loop is first used to cool the voltage regulator and then to cool the primary cooling loop of the internal combustion engine.

Thus it is one object of the invention to decrease the ambient temperature seen by the semiconductor devices of the voltage regulator by using the same secondary cooling loop used by the internal combustion engine. Decreasing the ambient temperature of the semiconductor devices increases their life and permits the use of lower powered and less expensive semiconductor devices.

In one embodiment, raw water in the secondary cooling loop passes through a heat conductive tube held in close proximity to a heat sink attached to the semiconductor device. The heat conductive tube may be metal or elastomeric cooling system hose.

Thus it is another object of the invention to provide a method of exchanging heat between the semiconductor device and the cooling water that may make use of standard cooling components.

Other objects and advantages besides those discussed above shall be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

Figure 1:
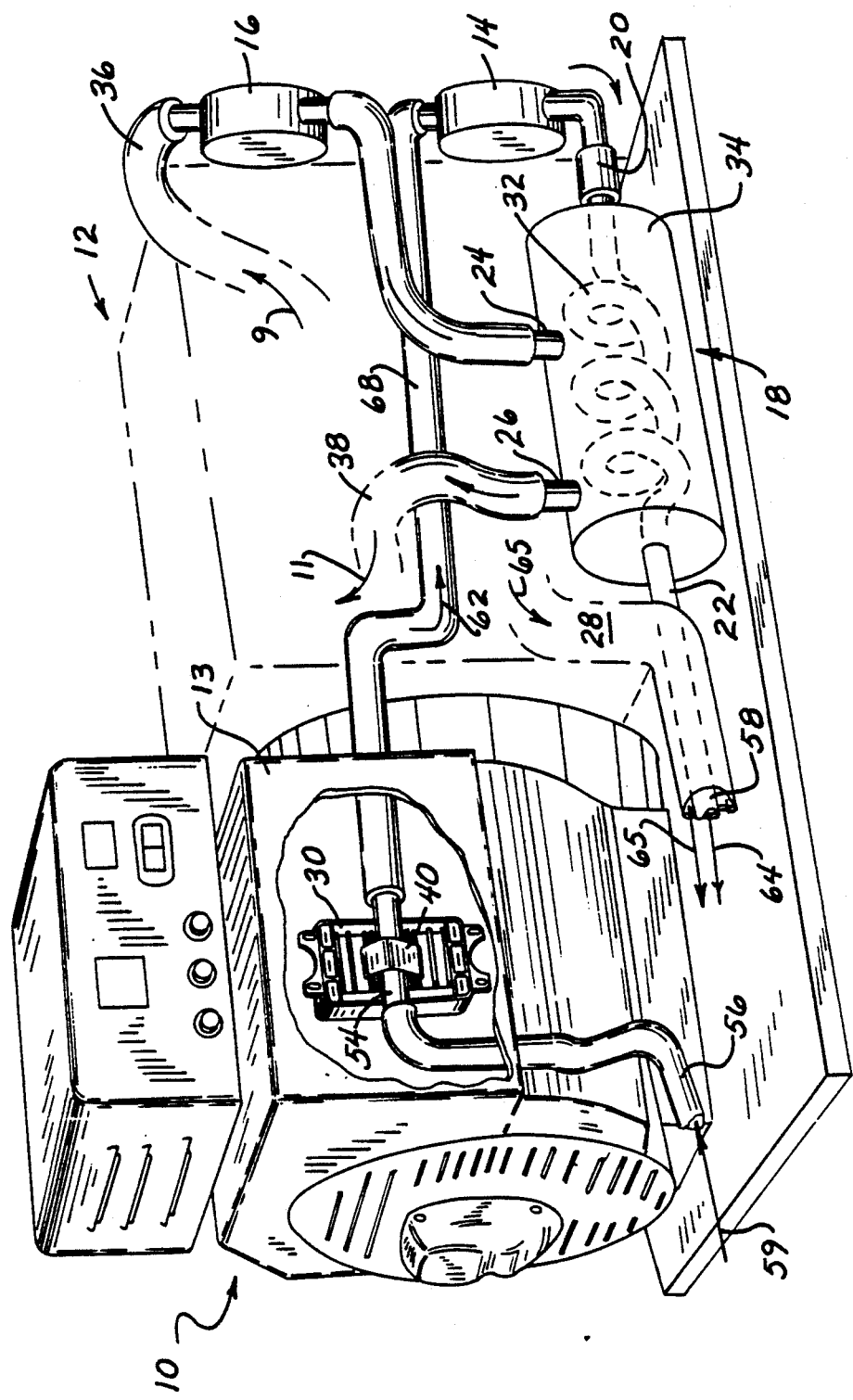
FIG. 1 is a perspective view of a generator and engine showing the location of the regulator assembly and the routes of the primary and secondary cooling loops. The engine and connections thereto are shown in phantom.

Referring to FIG. 1, an A.C. synchronous electrical generator 10, having an 8 kW capacity, is mounted so as to be driven by an internal combustion engine 12. The generator 10 is partially covered with a sheet metal shroud 13 and attached to the inner surface of the shroud 13 is a voltage regulator 30. The regulator 30 controls the current through the field windings (not shown) of the generator 10 to control the output voltage of the generator 10 as is well understood in the art. Affixed to the regulator 30 by means of clip 40 is a heat conducting tube 54 carrying cooling water as will be described further below.

The engine 12 is a three cylinder diesel engine having a horsepower rating of approximately 13.5. It is cooled by a primary cooling loop communicating with a secondary cooling loop by means of a water-to water heat exchanger 18 as will be described further below. The primary cooling loop circulates coolant 9 and 11 through channels (not shown) formed in the block of engine 12 to absorb heat from the combustion process. The secondary cooling loop draws raw water 59 from a reservoir at ambient temperature to absorb heat from the primary cooling loop by means of heat exchanger 18. The water-to-water cooling system eliminates the need for a radiator or a radiator fan on the engine 12.

Without a radiator fan, the air around the generator may rise to as high as 50° C. This elevated temperature restricts the ability of the regulator 30 to dissipate heat into the air to maintain the regulator components at or below their desired operating temperature of approximately 70° C.

Figure 2A:
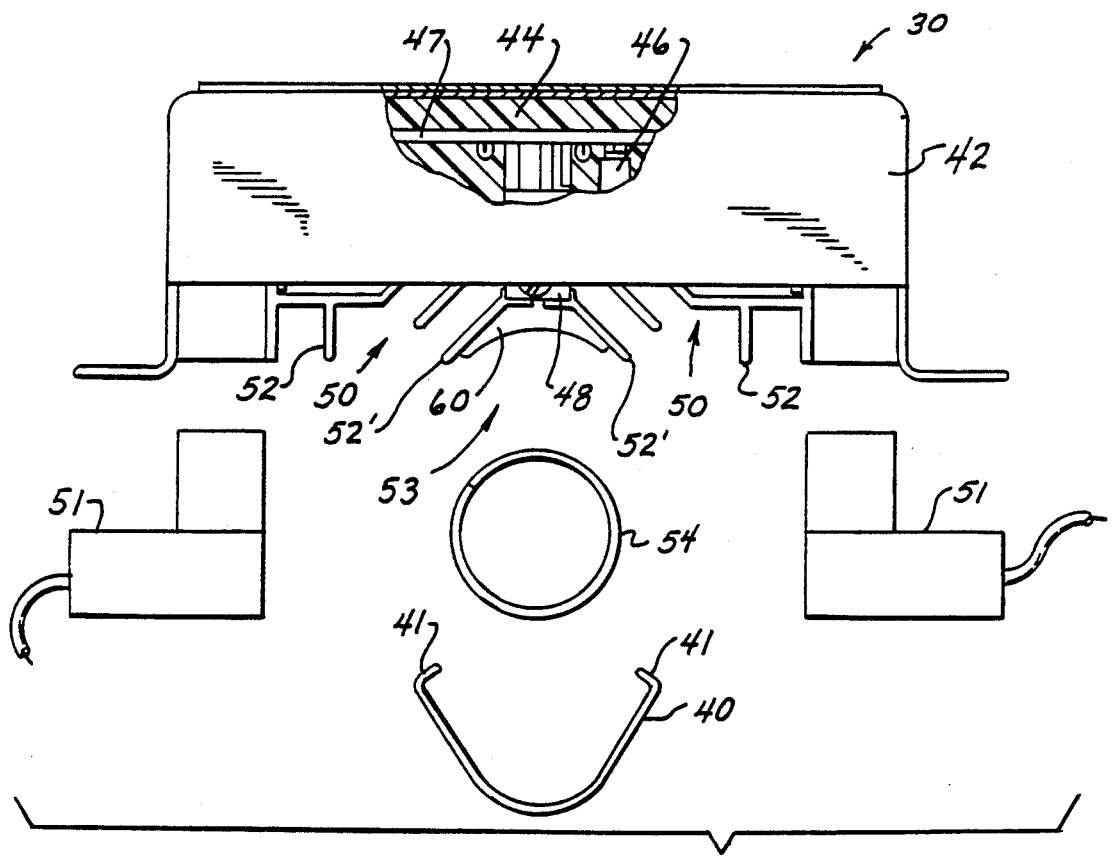
FIG. 2(a) is an exploded plan view of the regulator assembly of FIG. 1 showing the heat conducting tube used for cooling the regulator and the clip used to attach the conducting tube to the regulator heat sink.

Referring to FIG. 2(a), the regulator 30 has electronic circuitry 46, including a solid state regulator silicon controlled regulator ("SCR") 48, attached to a printed circuit board 47 and held within a generally box-shaped metal regulator housing 42. The regulator housing 42 is open at a bottom face to receive the printed circuit card 47 containing the electronic circuitry 46 and the SCR 48 and to permit the addition of a potting material 44 providing vibration and moisture protection to these components.

Attached below the printed circuit card 47 to the regulator SCR 48 is heat sink 50 comprised generally of a length of extruded aluminum having a series of fins 50 projecting in a generally downward direction. The heat sink 50 is electrically insulated from the case of the SCR 48 by means of a mica washer and insulating hardware (not shown) as is well known in the art.

The heat sink 50 is orientated so that fins 52 extend downward from the open face of the regulator housing 42 and the potting material 44. The centermost fins 52′ are splayed outwardly to form between them a channel 53 to accept conductive tube 54.

Figure 2B:
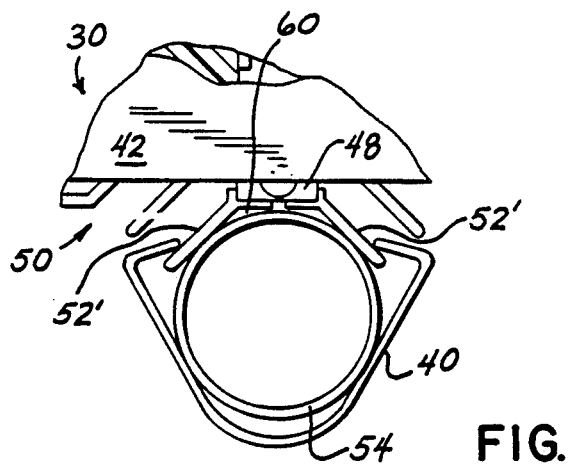
FIG. 2(b) is a detail plan view of the regulator assembly, from the same direction as that of FIG. 2(a), showing the heat conducting tube attached to the regulator by the clip.

Referring to FIG. 2(b), the conductive tube 54 is held within the channel 53, formed between the centermost fins 52′, by means of spring clip 40 formed from a short U-shaped band of spring steel. Inwardly opposing flanges 41 at either end of the spring clip 40 engage the upper surface of the outwardly splayed fins 52′ and capture the conductive tube 54 between the upwardly facing surface of the clip 40 and the downwardly facing surface of the channel 53. The heat conducting tube 54 is preferably a thin walled aluminium pipe, however other material may be used as will be apparent to those skilled in the art. For example, in a second embodiment, the heat conducting pipe 54 may be a elastomeric cooling system hose providing improved vibration and electrical insulation, although with some increased thermal resistance, between the heat sink 50 and the raw water 59 contained in the heat conducting tube 54.

A heat conducting grease 60 such as is commonly used to improve the thermal conductance between a semiconductor and a heat sink, may be placed between the conductive pipe 54 and the channel 53 of the heat sink 50 to improve the conduction of heat by filling air gaps therebetween.

As mentioned, the regulator 30 is attached to the inner surface of the generator shroud 13 so as to be proximate to the field windings that it controls. Elevating connectors 51 space the lower surface of the regulator 30 from the shroud 13 so as to provide sufficient room for the attachment of the heat conductive pipe 54 as described above. The elevating connectors 51 also provide electrical connection between the regulator 30 and the generator 10 circuitry.

Referring again to FIG. 1, raw water 59 at an ambient temperature of approximately 32° C. is received by intake hose 56. This raw water 59 of ambient temperature is drawn by secondary loop water pump 14, to be described below, into the conductive tube 54 thus conducting excess heat from the regulator 30 to keep its temperature below 70° C. The raw water 59 becomes warmed water 62, which leaves the heat conductive tube 54 increased in temperature only slightly above ambient, and is drawn through hose 68 to the inlet of secondary loop water pump 14 which is a rotary pump driven by the engine 12 and having a capacity of approximately 3.0 gpm. The warmed water 62 exiting the secondary loop water pump 14 is directed into the secondary coil 32 of heat exchanger 18 via secondary inlet 20. The warmed water 62 circulates through the secondary coil 32 of the heat exchanger 18, absorbing heat from the engine coolant 9 contained in the heat exchanger primary housing 34 which surrounds the secondary coil 18.

The warmed water 62 becomes heated water 64 which exits the secondary outlet of the heat exchanger 22 and enters the engine exhaust pipe 28 via outlet pipe 58 to be mixed with and to cool exhaust gases 65, before returning to an environmental reservoir, often a lake or sea.

As mentioned, the warmed water 62 absorbs heat from the hot engine coolant 9 contained in the primary housing 34 of the heat exchanger 18. The hot engine coolant 9 is received from the engine 12 via engine coolant outflow hose 36. The coolant 9 previously held in channels formed in the block of engine 12, has absorbed heat from the combustion process and may be as hot as 120° C. A primary loop coolant pump 16, similar to the secondary loop water pump 14, forces the hot engine coolant 9 through the primary inlet 24 and into the primary housing 34 of the heat exchanger 18. Within the primary housing 34, the hot engine coolant 9 releases heat to the secondary cooling loop containing warmed water 62 as has been described, and becomes cool engine coolant 11. The cool engine coolant 11 exits the primary outlet 26 to return to the engine 12 via coolant inflow hose 38 to absorb more heat from the engine 12 prior to returning again to the heat exchanger 18 as hot engine coolant 9 via coolant out 36.

The heat exchanger 18 thus permits the use of a closed primary cooling loop for the engine 12 allowing preservation of beneficial concentrations of the coolant additives such as antifreeze, corrosion inhibitors and anti-foaming ingredients. The separate primary cooling loop also simplifies the thermostatic regulation of the engine 12 to higher than ambient temperatures as is necessary for efficient engine 12 operation. The heat exchanger 12 serves in an analogous manner to a radiator as used in automotive engines.

The secondary cooling loop using raw water 59 and returning heated water 64 is open loop and thus the raw water flowing past the regulator 30 does not rise appreciably in temperature with continued operation of the engine 12 and the generator 10. The placement of the regulator 30 near the intake hose 56, and upstream from the heat exchanger 18 allows efficient use of the secondary cooling loop to meet the relatively low temperature regulation requirements of the regulator 30 as well as the higher temperature regulation requirements of the engine 12.

As will be apparent from the above description to those of ordinary skill in the art, the raw water 59 may be from any relatively cool reservoir of water including environmental water such as that of rivers and lakes, as well as high capacity wells or even city water supplies. In the latter case, the heated water 64 is not mixed with the exhaust 65 but discharged separately into a drain.

The above description has been that of a preferred embodiment of the present invention. It will occur to those who practice the art that many modifications may be made without departing from the spirit and scope of the invention. In order to apprise the public of the various embodiments that may fall within the scope of the invention, the following claims are made.

I claim:

1. An electrical regulator for use with a generator powered by an internal combustion engine for producing an electrical current, the internal combustion engine having a separate coolant system exchanging heat with an external reservoir of water at ambient temperature, the regulator comprising:
   a heat conductive tube for receiving a stream of water from the external reservoir prior to that stream of water exchanging with the separate cooling system;
   a solid state device having means for controlling the field current to the generator; and
   a support means for attaching the solid state device to the heat conductive tube permitting the conduction of heat between the solid state device and the stream of water.

2. The regulator of claim 1 wherein the support means comprises:
   a heat sink having a plurality of fins for radiating heat; and
   a means for attaching the heat conductive tube to the heat sink.

3. The regulator of claim 1 wherein the heat conductive tube is a metal tube.

4. The regulator of claim 1 wherein the heat conductive tube is a elastomeric hose.

* * * * *

UNITED STATES PATENT AND TRADEMARK OFFICE
CERTIFICATE OF CORRECTION

PATENT NO. : 5,058,660
DATED : October 22, 1991
INVENTOR(S) : Randall J. Hedstrom It is certified that error appears in the above-identified patent and that said Letters Patent is hereby corrected as shown below:

Col. 4, line 60,   "via coolant out 36" should be
--via coolant outflow hose 36--.

Col. 6, line 10,   --heat-- should be inserted after the word "exchanging."

Signed and Sealed this

Twenty-third Day of February, 1993

Attest:

STEPHEN G. KUNIN

*Attesting Officer*   Acting Commissioner of Patents and Trademarks